United States Patent [19]

Nathenson et al.

[11] Patent Number: 4,842,054

[45] Date of Patent: Jun. 27, 1989

[54] PUMP/HEAT EXCHANGER ASSEMBLY FOR POOL-TYPE REACTOR

[75] Inventors: Richard D. Nathenson, Pittsburgh; Robert M. Slepian, Monroeville Boro, both of Pa.

[73] Assignee: Westinghouse Electric Corp., Pittsburgh, Pa.

[21] Appl. No.: 875,150

[22] Filed: Jun. 17, 1986

[51] Int. Cl.$^4$ .............................................. F28D 15/00
[52] U.S. Cl. ........................... 165/104.28; 165/104.23; 417/50
[58] Field of Search ...................... 165/104.28, 104.23, 165/120; 417/50

[56] References Cited

U.S. PATENT DOCUMENTS

| | | |
|---|---|---|
| 2,655,107 | 10/1953 | Godbold . |
| 3,005,313 | 10/1961 | Carlson, Jr. . |
| 3,034,002 | 5/1962 | Carlson, Jr. . |
| 3,115,837 | 12/1963 | Campana . |
| 3,179,824 | 4/1965 | Stuetzer . |
| 3,214,615 | 10/1965 | Way . |
| 3,216,182 | 11/1965 | Cochran et al. . |
| 3,248,578 | 4/1966 | Brill et al. . |
| 3,280,349 | 10/1966 | Brenner et al. . |
| 3,432,694 | 3/1969 | Bidard . |
| 3,567,339 | 3/1972 | Paine . |

FOREIGN PATENT DOCUMENTS

| | | |
|---|---|---|
| 0061120 | 9/1982 | European Pat. Off. . |
| 0170163 | 2/1986 | European Pat. Off. . |
| 0176705 | 4/1986 | European Pat. Off. . |
| 745460 | 2/1956 | United Kingdom . |
| 905940 | 9/1962 | United Kingdom . |
| 2033644B | 9/1982 | United Kingdom . |

OTHER PUBLICATIONS

EPRI, "A Proposed Concept for Economical Breeder Planks" by R. K. Winkleblack, Dec. 19, 1980.
EPRI, "High-Efficiency DC Electromagnetic Pumps and Flow Couplers for LMFBRs" by I. R. McNab and C. C. Alexion, Jan., 1981.
"Demonstration of a Flow Coupler for the LMFBR" by R. D. Nathenson, C. C. Alexion, A. R. Keeton, and O. E. Gray, III, Mar. 5, 1984.
"Sodium Electrotechnology at the Risley Nuclear Power Development Laboratories," by Davidson et al., Nucl. Energy, 1981, vol. 20, Feb., No. 1, 79-90.

Primary Examiner—Albert W. Davis, Jr.

[57] ABSTRACT

A heat exchanger and pump assembly comprising a heat exchanger including a housing for defining an annularly shaped cavity and supporting therein a plurality of tubes. A pump is disposed beneath the heat exchanger and is comprised of a plurality of flow couplers disposed in a circular array. Each flow coupler is comprised of a pump duct for receiving a first electrically conductive fluid, i.e. the primary liquid metal, from a pool thereof, and a generator duct for receiving a second electrically conductive fluid, i.e. the intermediate liquid metal. The primary liquid metal is introduced from the reactor pool into the top, inlet ends of the tubes, flowing downward therethrough to be discharged from the tubes' bottom ends directly into the reactor pool. The primary liquid metal is variously introduced into the pump ducts directly from the reactor pool, either from the bottom or top end of the flow coupler.

7 Claims, 8 Drawing Sheets

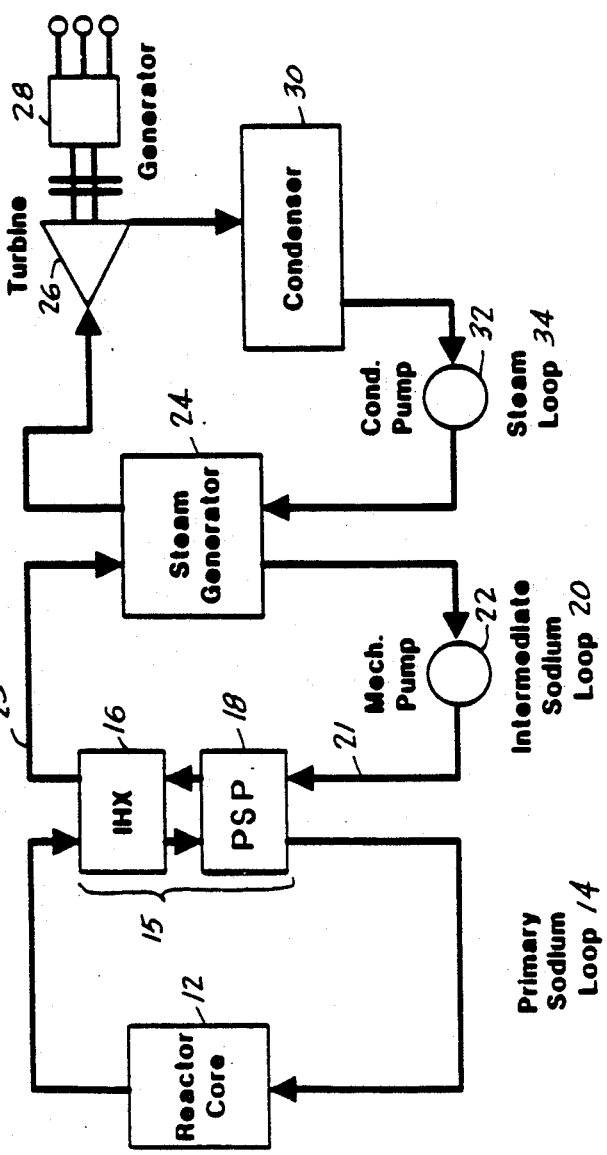

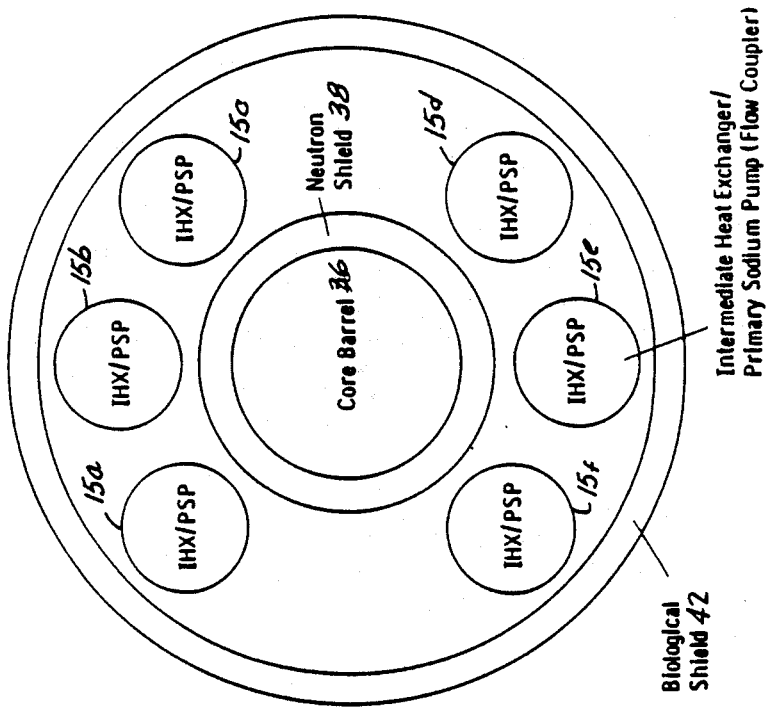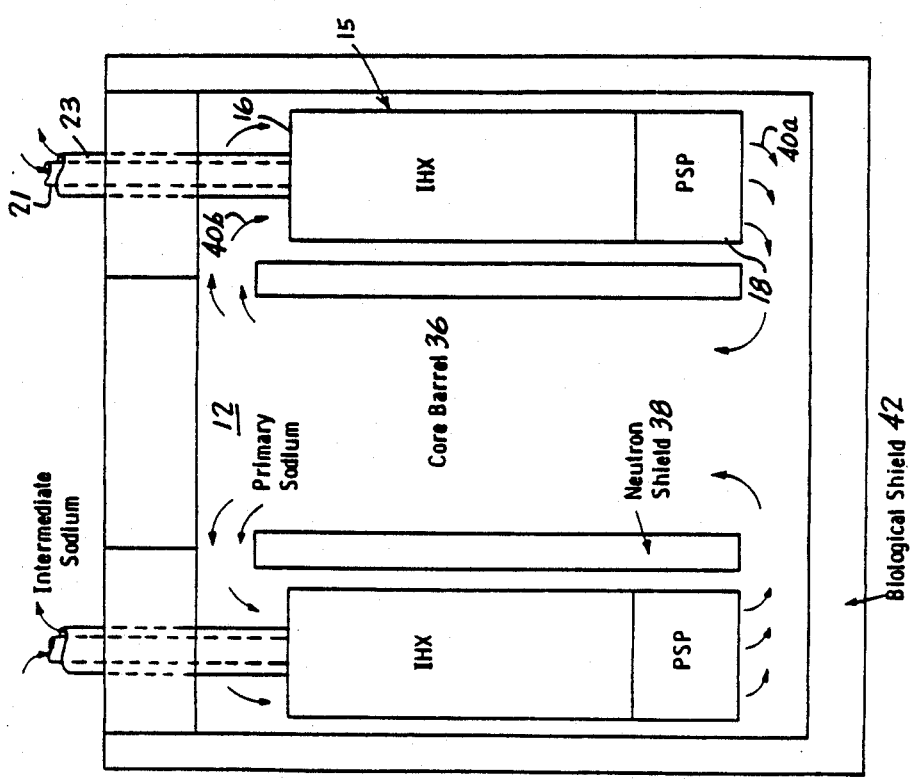

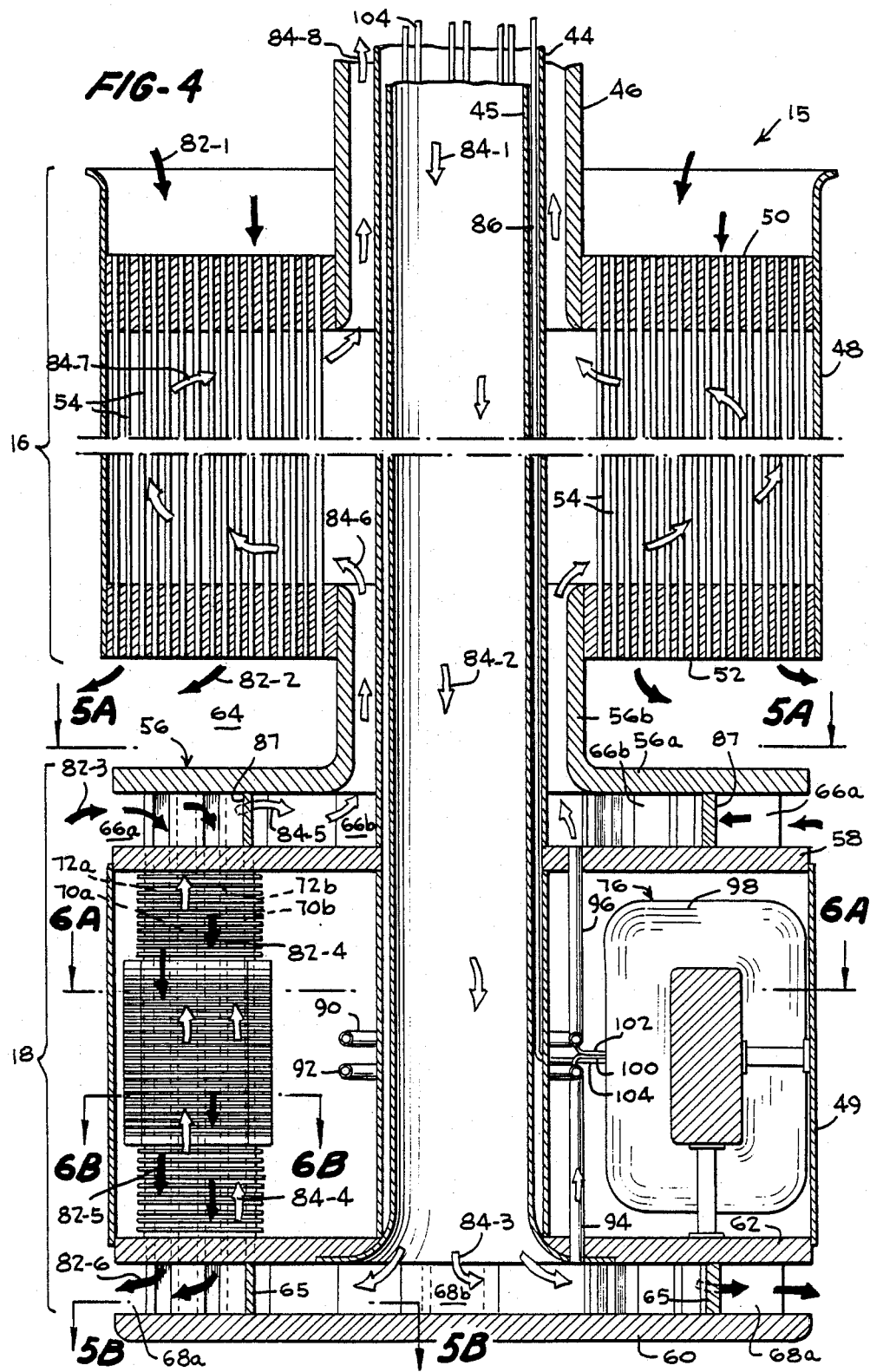

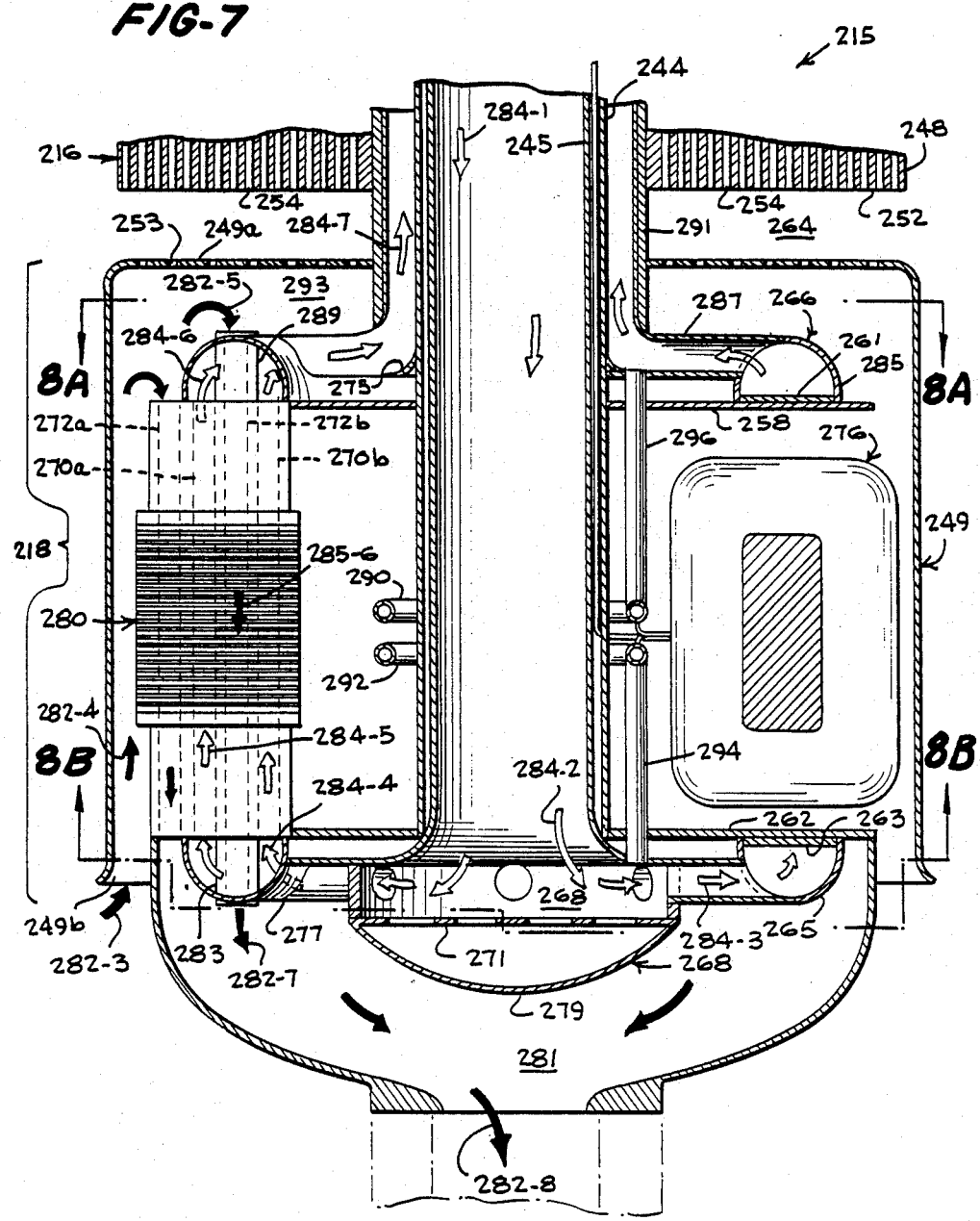

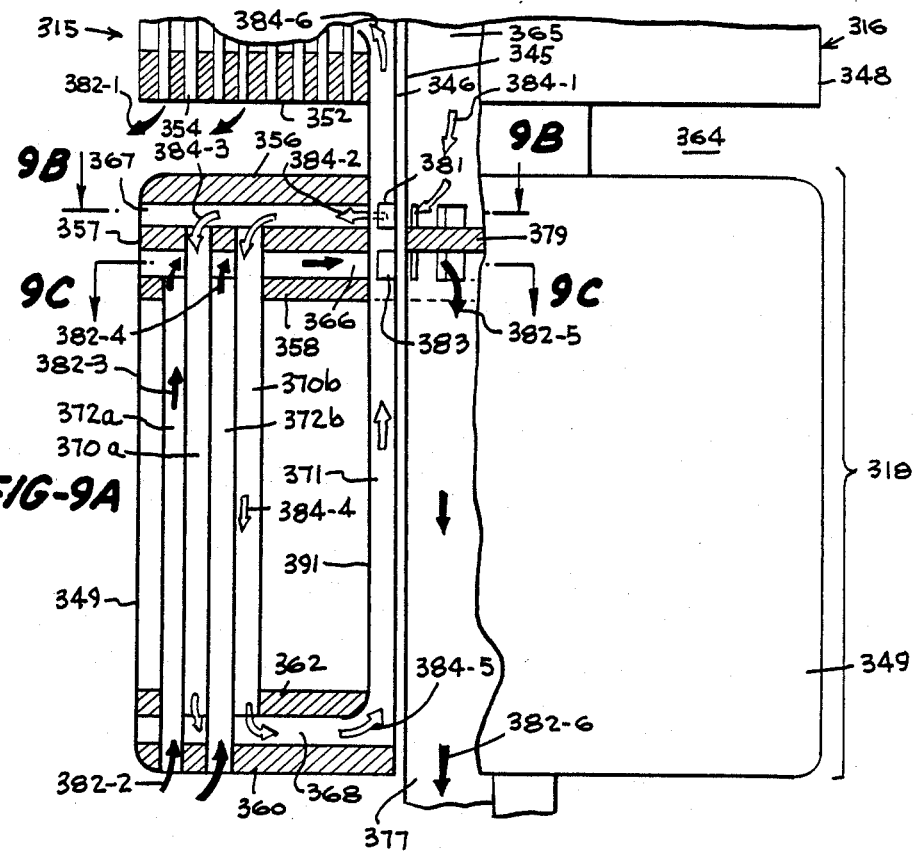
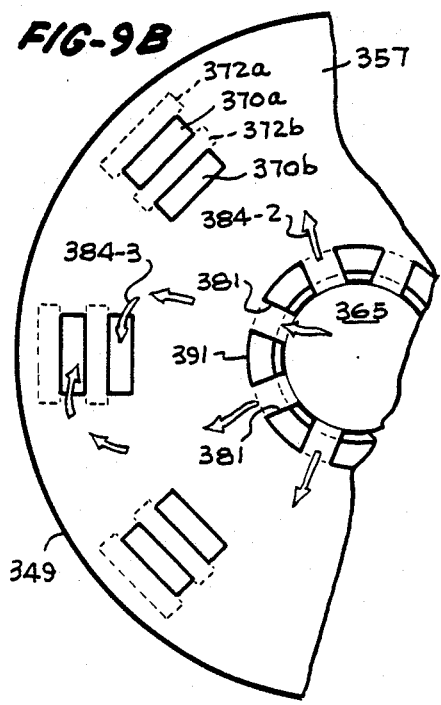
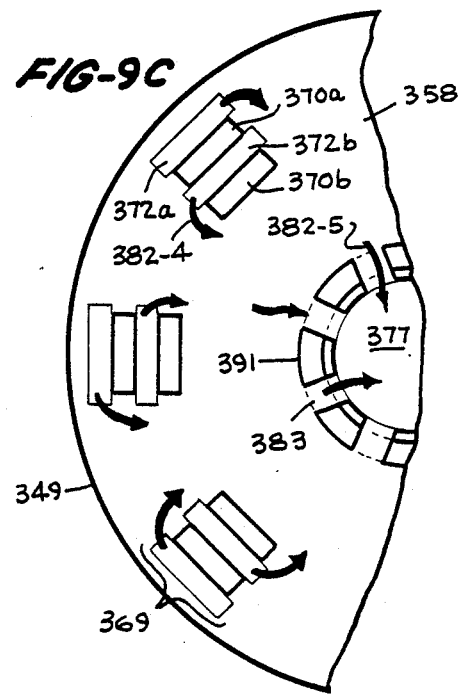

PUMP/HEAT EXCHANGER ASSEMBLY FOR POOL-TYPE REACTOR

BACKGROUND OF THE INVENTION

1. Field of the Invention

This invention relates to assemblies of a flow coupler and heat exchanger for coupling first and second flows of electrically conductive liquids such as the primary and intermediate liquid metals of a nuclear reactor, to pump the first flow and to heat the second flow. It is specifically contemplated that this pump/heat exchanger assembly will be incorporated into pool-type nuclear reactors.

2. Reference to Co-pending Applications

Reference is made to the following co-pending, commonly assigned patent applications:

(1) U.S. Ser. No. 822,183, entitled "Electromagnetic Flow Coupler for Regulating Flow Rate/Pressure," filed Jan. 24, 1986 in the names of C. C. Alexion and R. D. Nathenson; and (2) U.S. Ser. No. 875,151, pending entitled "A Pump/Intermediate Heat Exchanger Assembly For A Liquid Metal Reactor," filed June 17, 1986 in the names of R. D. Nathenson, C. C. Alexion and W. C. Sumpman.

3. Description of the Prior Art

Early in the development of the liquid-metal fast breeder or nuclear reactor (LMFBR), it was recognized that liquid metals could be pumped by electromagnetic (EM) pumps. Such EM pumps offer the advantages of inherent simplicity and the lack of moving parts as compared with conventional, rotating impeller pumps. Such mechanical pumps. Such EM pumps offer the advantages of inherent simplicity and the lack of moving parts as compared with conventional, rotating impeller pumps. Such mechanical pumps have inherent problems associated with vibration or thermal distortion in areas of closely toleranced moving parts, such as bearings or seals. Furthermore, cavitation problems associated with a rotating impeller of mechanical pumps do not exist in an EM pump.

One such EM pump, known as a flow coupler, is particularly adapted to pump the primary flow of liquid metal to be heated by a core of the nuclear reactor. Such flow couplers transfer the internal energy of an intermediate flow of liquid metal to the primary flow, driving or pumping the primary flow.

Early examples of such flow couplers are described in U.S. Pat. No. 2,715,190 of Brill and UK Pat. No. 745,460 of Pulley. In a typical flow coupler, a driven liquid metal in the intermediate flow is directed through a generator duct of the flow coupler. Adjacent to the generator duct is a pump duct, through which flows the primary flow. The intermediate and primary flows of liquid metal within the generator and pump ducts are exposed to a common magnetic field. Passage of the first flow through the common magnetic field generates a relatively low voltage, which produces a large current in the generator duct, which is applied to the pump duct by a short, low resistance electrode disposed between the generator and pump ducts and by return conductors disposed on either side of the ducts. Interaction of the resulting high current in the pump duct with the common magnetic field drives the primary flow in the pump duct. In this manner, the intermediate flow of the liquid metal in the generator duct is "coupled" to the primary flow of the liquid metal in the pump duct. The use of such flow couplers in LMFBR systems is described in "Sodium Electrotechnology at the Risley Nuclear Power Development Laboratories", by D. F. Davidson et al., NUCLEAR ENERGY, 1981, Volume 20, February, no. 1, pp. 79–90. U.S. Pat. No. 4,469,471 of A. R. Keeton, et al. describes an improved embodiment of such a flow coupler.

In U.S. Pat. No. 4,412,785 of W. G. Roman, there is described a flow coupler/heat exchanger assembly for use with a nuclear reactor. The assembly forms an annular region between inner and outer shells. A plurality of tube sets is disposed within the annular region, with relatively large spaces between adjacent tube sets. A magnetic field is established in a radial direction through the annular region. A first conductive fluid, e.g. the intermediate liquid metal, is pumped through the spaces between the tube sets by an enlarged intermediate pump. A second conductive fluid, e.g. the primary liquid metal, is introduced into the tube sets. The radial magnetic flux couples the flow of intermediate liquid metal with the flow of primary liquid metal. The externally pumped flow of the intermediate liquid metal in the spaces between the tube sets through the radial magnetic flux, produces a voltage and a current in a circumferential direction about the annular region. The current passes through the adjacent tubes and the primary liquid metal therein, producing a driving force in the opposite direction, whereby the primary liquid metal is driven or pumped.

In a publication entitled, "High-Efficiency DC Electromagnetic Pumps and Flow Couplers For LMFBRs," EPRI NP-1656, TPS 79-774, Final Report, January 1981, by I. R. McNab and C. C. Alexion, there is described an integral assembly of a heat exchanger and a flow coupler for a pool-type, LMFBR. A plurality of duct modules is disposed in a circle, with a magnetic field coil disposed between adjacent duct modules. Each duct module includes a pump duct through which the primary liquid metal flows and a generator duct through which the intermediate liquid metal flows in an opposite direction. The magnetic flux generated by the magnetic field coil is directed by an iron circuit to form a circular magnetic field through all of the duct modules. In one embodiment, the intermediate liquid metal is introduced into a centrally disposed inlet and directed downwardly to be introduced to an intermediate heat exchanger comprised of a plurality of vertically oriented tubes. The intermediate liquid metal is then directed upward and about these tubes, before being introduced into each of the generator ducts. The primary flow of liquid metal is directed downwardly through the pump ducts, exiting the pump ducts and being introduced into the tubes of the intermediate heat exchanger, flowing downwardly therethrough, before being discharged and recirculated to the nuclear core. It is contemplated that the flow coupler may be located beneath such an intermediate heat exchanger. In the described embodiment, both of the intermediate and primary flows of liquid metal through the flow coupler, are disposed at the relatively high temperature as appears at the outlet of the nuclear core, e.g. in the range of 900° to 1,000° F. If the temperature of the liquid metal flows could be reduced, the electrical efficiency of the flow coupler could be improved. Further, the mechanical design requirements of a flow coupler operating at reduced temperatures would be less demanding. Further, both of the upper, discharge ends of the vertically oriented tubes of the intermediate heat exchanger and of the lower, input ends of the generator ducts of the flow coupler, are supported by but a single tube sheet or support plate. As a result, the generator ducts displace a number of the intermediate heat exchanger tubes, that would otherwise be supported by the single support plate, thus requiring an assembly of greater diameter or dimension to accommodate a given number of tubes, as require to receive a predetermined flow of the intermediate liquid metal therethrough. It is desired for the greatest efficiency of heat transfer between the intermediate and primary flows of liquid metal, to increase the flow of the intermediate liquid metal, while maintaining or reducing the size of the integral assembly of the heat exchanger and flow coupler.

The above-identified application entitled, "A Pump-/Intermediate Heat Exchanger Assembly For A Liquid Metal Reactor," describes an assembly of a flow coupler and an intermediate heat exchanger for a nuclear reactor, wherein the flow coupler is disposed beneath the intermediate heat exchanger and in a co-linear relationship therewith. The primary liquid metal is directed from the reactor core and is introduced into the intermediate heat exchanger flowing down through an array of tubes enclosed in an annular cavity of the intermediate heat exchanger. The intermediate liquid metal is fed into the assembly via a centrally disposed "downcomer" pipe through the intermediate heat exchanger to the flow coupler and, in particular, to a first plenum for distributing the intermediate liquid metal to a plurality of flow couplers or duct modules, each comprised of one or more sets of pump and generator ducts. The intermediate liquid metal exits the plenum being directed up in parallel through the generator ducts of the flow coupler modules. The intermediate liquid metal exiting the pump ducts is collected in the second plenum before being introduced into the annular cavity to be heated by the primary liquid metal flowing downwardly through the tubes. After being heated, the intermediate liquid metal is discharged and directed to a steam generator. The cooled, primary liquid metal is discharged from the tubes into a third plenum, before it is directed downwardly in parallel through the plurality of generator ducts, whereby the cooled, intermediate liquid metal is directed at relatively high pressure, i.e. pumped, into a large plenum at the bottom of the nuclear reactor for return to the reactor core.

The above described flow coupler/intermediate heat exchanger assembly employs three plenums for collecting and redirecting either the primary or intermediate liquid metal. Such plenums typically require relatively thick, heavy pressure plates, which account for nearly 40% of the weight of the flow coupler/intermediate heat exchanger assembly. Such heavy, thick pressure plates were used in order to withstand the relatively high pressure differences between the primary and intermediately fluids, as well as to withstand the relatively fast temperature changes as may occur within these assemblies.

Further, the flow coupler/intermediate heat exchanger assembly to be described, is to be incorporated into a pool-type nuclear reactor, wherein it is disposed within a pool of the primary liquid metal, e.g. sodium. When so immersed, it is often desirable that the primary sodium exiting the intermediate heat exchanger be returned directly to the pool to improve mixing within the pool and ensure uniform heat exchanger performance. Further, there are advantages to withdrawing directly the primary liquid metal from the pool and injecting it into the flow coupler.

SUMMARY OF THE INVENTION

It is an object of this invention to provide a new and improved pump and heat exchanger as particularly adapted to being incorporated into a pool-type nuclear reactor system.

It is a still further object of this invention to provide a new and improved pump and heat exchanger of reduced weight.

It is a still further object of this invention to provide a new and improved pump and heat exchanger assembly, which is designed to receive and to discharge flows of the primary liquid metal directly from and to the reactor pool.

In accordance with these and other objects of this invention, there is provided a heat exchanger and pump assembly comprising a heat exchanger including a housing for defining an annularly shaped cavity and supporting therein a plurality of tubes. An electromagnetic pump is disposed beneath the heat exchanger and is comprised of a plurality of flow couplers disposed in a circular array. Each flow coupler is comprised of pump ducts for receiving a first electrically conductive fluid, i.e. the primary liquid metal, from a pool thereof, and generator ducts for receiving a second electrically conductive fluid, i.e. the intermediate liquid metal. In a first embodiment of this invention, a conduit in the form of a downcomer tube, is disposed centrally of the assembly and passes through the annular shaped cavity and the array of flow couplers to discharge the intermediate fluid into a first plenum chamber. The first plenum chamber is disposed in communication with the generator ducts of all of the flow couplers, whereby the intermediate liquid metal flows upward through the generator ducts. A second cavity is disposed above the flow coupler and includes a baffle for dividing the second cavity into a second plenum chamber in communication with the generator ducts for collecting and discharging the flow of the second electrically conductive fluid therefrom, and a third plenum chamber open to the pool and in communication with the generator ducts to input a flow of the primary liquid metal into and down the pump ducts.

In a second embodiment of this invention, the centrally disposed conduit is disposed in communication with a first plenum chamber. An annularly shaped plenum chamber is disposed thereabout and a plurality of radially disposed pipes interconnects the first plenum chamber and the annularly shaped plenum chamber, whereby the secondary liquid metal is directed via the conduit, the first plenum chamber, the plurality of pipes and the annularly shaped plenum into the generator ducts to be directed upwardly thereby. A second annularly shaped plenum is disposed in communication with the upper ends of the generator ducts to receive and to discharge the intermediate liquid metal therefrom. A housing defines a shell about the flow coupler permitting the flow of the primary liquid metal upward and into the pump ducts. The housing shell is used to separate the upward flow from a second flow of the primary liquid metal from the tubes of the heat exchanger to the pool. The housing therefor has the second primary flow on one surface thereof and the first flow of the primary liquid metal on another, opposite surface thereof. The first and second flows of the primary liquid metal hydrostatically balance the housing.

In a third illustrative embodiment of this invention, the primary liquid metal is introduced at the bottom of the flow coupler flowing upwardly through the pump ducts of the flow coupler and into a first plenum chamber in communication with a first, centrally disposed conduit, which directs the pumped, primary liquid metal downward to be discharged into the pool. The intermediate liquid metal is introduced into the flow coupler via a second, centrally disposed conduit into a second plenum chamber. The second plenum chamber is disposed in communication with the top, inlet ends of the generator ducts, whereby the intermediate liquid metal is directed down therethrough. The bottom, outlet ends of the generator ducts exit the intermediate liquid metal into a third plenum chamber. A third, annularly shaped conduit directs the intermediate liquid metal back upward.

BRIEF DESCRIPTION OF THE DRAWINGS

The advantages, nature and additional features of the invention will become more apparent from the following description, taken in connection with the accompanying drawings, in which:

FIG. 1 is a simplified schematic of a nuclear liquid metal reactor system incorporating an assembly of a primary sodium pump (PSP) and heat exchanger in accordance with the teachings of this invention;

FIGS. 2 and 3 are respectively a simplified, broken away side view and a top, plan view of a pool-type, nuclear liquid metal reactor as shown in FIG. 1;

FIG. 4 is a side, sectioned view of a first embodiment of the PSP/heat exchanger assembly as incorporated into the pool-type nuclear reactor system as generally shown in FIGS. 2 and 3;

FIG. 7 is a side, sectioned view of a second embodiment of the PSP/heat exchanger assembly as may by incorporated into the pool-type nuclear reactor as shown in FIGS. 2 and 3;

FIG. 9A is a partially sectioned, side view of a third embodiment of the PSP/heat exchanger assembly as incorporated into the pool-type nuclear reactor as shown in FIGS. 2 and 3; and FIGS. 9B and 9C are respectively partial, sectioned views of the PSP/heat exchanger assembly as taken along lines 9B—9B and 9C—9C of FIG. 9A.

DESCRIPTION OF THE PREFERRED EMBODIMENTS

Figure 5A:
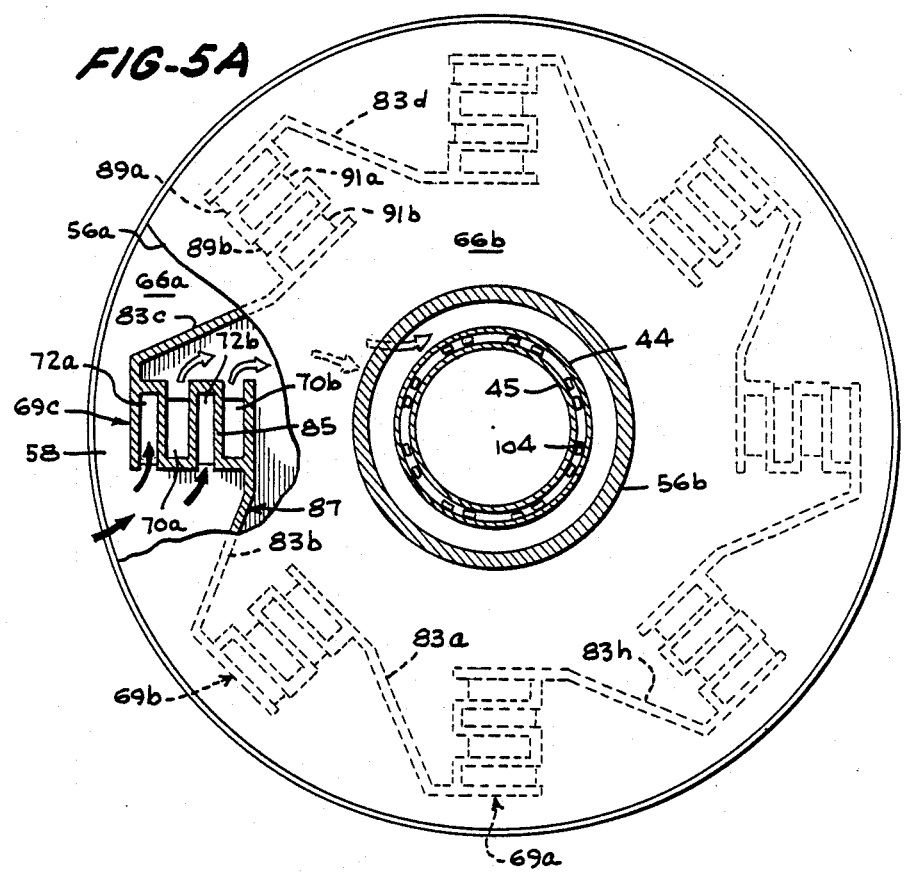
FIGS. 5A and 5B are respectively a full and a partial, plan, sectioned view of the PSP/heat exchanger assembly as taken along lines 5A—5A and 5B—5B of FIG. 4.

Referring now to the drawings and in particular to FIG. 1, there is shown a reactor system 10 including an assembly 15 of an intermediate heat exchanger (IHX) 16 and a flow coupler or primary sodium pump (PSP) 18. The IHX 16 and the PSP 18 are coupled in circuit with a primary loop or flow 14 of an electrically conductive fluid, such as sodium, and an intermediate loop or flow 20 of an electrically conductive fluid, e.g. sodium. As will be explained, the PSP 18 pumps the liquid metal about the primary loop 14 to and from a reactor core 12, where the primary fluid is heated to relatively high temperatures on the order of 500° C.

The IHX 16 transfers thermal energy from the heated primary liquid metal to the intermediate liquid metal. In the intermediate loop 20, a mechanical pump 22 pumps the intermediate liquid metal through an inlet conduit 21 to the PSP 18 in the form of a flow coupler, which as will be explained in detail below, transfers internal energy from the driven intermediate liquid metal to the primary liquid metal; it is contemplated that the mechanical pump 22 must be of increased capacity to also drive the primary liquid metal. The intermediate liquid metal passes through the IHX 16 receiving thermal energy from the primary liquid metal as heated by the core 12 and passes via outlet conduit 23 to a steam generator 24.

A vaporizable fluid, such as water, is circulated through the steam generator 24, whereby the water is vaporized, before being circulated about a steam loop 34 to a turbine 26, whereby the impellers of the turbine 26 are rotated to drive an electric generator 28, which in turn outputs electrical energy. The spent vapor leaves the turbine 26 and is condensed by a condenser 30, before returning to the condensate pump 32, to be recirculated through the steam generator 24.

A plurality of the PSP/IHX assemblies 15 is incorporated within a biological shield 42 disposed about the annular region surrounding a reactor core 12 of a pool type reactor, as illustratively shown in FIG. 2. Six such PSP/IHX assemblies 15a to 15f are disposed in a circular array about a core barrel 36, as shown in FIG. 3. A biological shield 42 surrounds the core barrel 36. The intermediate liquid metal is directed via inlet conduit 21 to the IHX 16 and discharged therefrom via conduit 23. The primary liquid metal is pumped by the PSPs 18 about a neutron shield 38 as shown by arrows 40a to be heated within the core barrel 36, before being returned as indicated by the arrows 40b to each of the plurality of IHXs 16.

Additional details of a first embodiment of the PSP/IHX assembly 15 are shown in FIGS. 4, 5A, 5B, 6A and 6B. Referring first to FIG. 4, the inlet conduit 21 is coupled to outer and inner downcomer pipes 44 and 45, which extend axially along substantially the entire length of the assembly 15 for introducing the intermediate liquid metal into a lower, interior plenum 68b, disposed at the bottom of the assembly 15. The outer downcomer pipe 44 is disposed concentrically about the inner downcomer pipe 45 and forms therewith a downcomer annulus 86. The intermediate liquid metal is directed as indicated by the arrows 84 through the PSP 18 and the IHX 16 to exit via an intermediate outlet conduit 46, which is disposed concentrically about the pipes 44 and 45 and is coupled to the outlet conduit 23 for conveying the intermediate liquid metal in the intermediate loop 20.

The PSP/IHX assembly 15 includes an IHX outer shell 48, which encloses the IHX 16 and supports at its upper end, an upper tube sheet 50 and at its lower end, a lower tube sheet 52. The upper and lower tube sheets 50 and 52 support therebetween an array of tubes 54. The tubes 54 are spaced from each other and disposed in that annular space formed between the IHX outer shell 48 and the outer downcomer pipe 44. As indicated by the arrows 84, the intermediate liquid metal flows about the tubes 54 and through this annular space. The primary liquid metal flows as indicated by the arrows 82 through the tubes 54, exiting from their lower ends into a IHX lower plenum 64. An annularly shaped support plate 56 having a cylindrically shaped collar 56b integrally attached thereto, is supported below the lower tube sheet 52 to form an IHX lower plenum 64 between the support plate 56a and the lower tube sheet 52. The IHX lower plenum 64 is open at its circumferential edge to permit the cooled primary liquid metal discharged from the tubes 54 to return directly to the pool. The plate 56 is supported within the assembly 15 by the lower tube sheet 52 and the outer downcomer pipe 44.

The PSP/IHX assembly 15 includes a PSP outer shell 49, which encloses and houses the PSP 18. The PSP outer shell 49 is connected at its upper end, to an inner, upper support plate 58, which includes a plurality of sets of openings disposed thereabout, for permitting the passage upwardly, therethrough of the intermediate liquid metal as suggested by the arrows 84. As will be explained later in detail, the plates 56 and 58, and a baffle 87 define an upper exterior plenum 66a, and an upper interior plenum 66b. The upper, interior plenum 66b receives and directs the intermediate liquid metal as it passes upwardly and exits from the PSP 18, into an interconnecting, annular passage formed between the outer downcomer pipe 44 and the collar 56b disposed concentrically about the pipe 44. The upper, exterior plenum 66a is directly open to the reactor pool to receive the primary liquid metal and direct it to the flow coupler 18, as will be explained. The PSP outer shell 49 is attached at its lower end to an inner lower support plate 62. The outer, lower support plate 60 is spaced below from the plate 62 and forms with a baffle 65, a lower, exterior plenum 68a the lower, interior plenum 68b. The lower interior plenum 68b receives from the downcomer pipe 44 the intermediate liquid metal and redirects it upward through openings within the plate 62 and through the PSP 18 as indicated by the arrows 84. The lower, exterior plenum 68a discharges into a reactor plenum, not shown, before the high pressure, primary liquid metal enters the core 12.

Figure 6A:
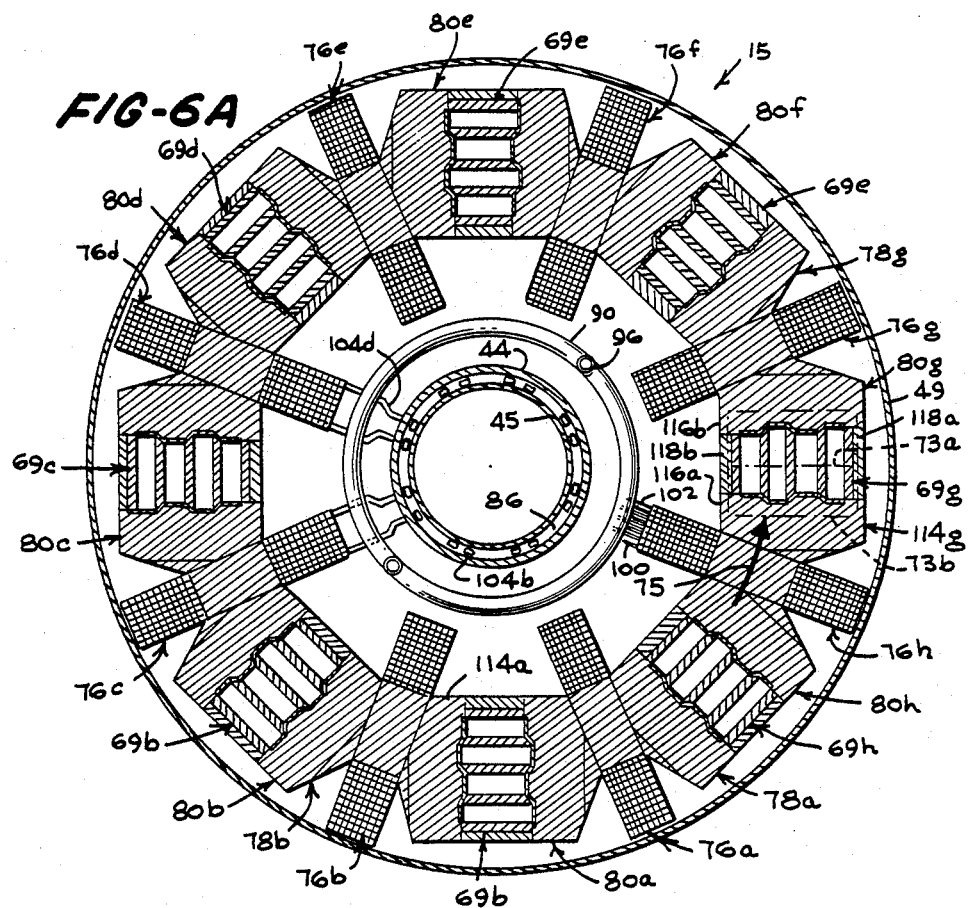
FIGS. 6A and 6B are respectfully a full and a partial plan, sectioned view of the PSP/heat exchanger assembly as taken along lines 6A—6A and 6B—6B of FIG. 4.
Figure 6B:
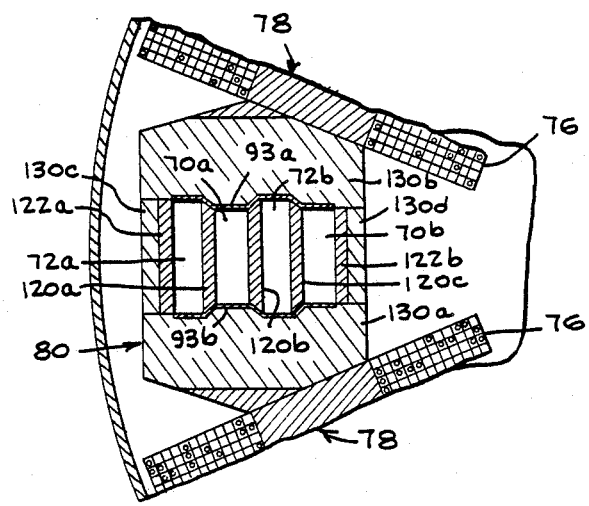

Referring now to FIGS. 6A and 6B in addition to FIG. 4, the PSP 18 illustratively comprises a plurality of individual pumps or flow couplers in the form of duct modules 69a to 69h. Each duct module 69 comprises a pair of intermediate or generator ducts 70a and 70b, and a second pair of primary or pump ducts 72a and 72b. Illustratively, the intermediate ducts 70 are disposed between the primary ducts 72 forming a sequence beginning at the PSP outer shell 49 of a primary duct 72a followed by the intermediate duct 70a, the primary duct 72b and the intermediate 70b. As particularly shown in FIG. 4, the intermediate liquid metal passes as indicated by the arrows 84 upwardly through each pair of intermediate ducts 70a and 70b of each duct module 69 or flow coupler, before being introduced collectively into the upper, interior plenum 66b. The primary liquid metal as indicated by the arrows 82 flows directly into the upper, exterior plenum 66a before being directed into primary ducts 72a and 72b, flowing downwardly therethrough to be discharged through the lower, exterior plenum 68a into the reactor plenum.

Referring particularly to FIGS. 6A and 6B, a toroidally shaped magnetic field is formed by a set of excitation coils 76a to 76h, each excitation coil 76 being disposed between an adjacent pair of duct modules 69. Each excitation coil 76 is disposed about its magnetic pole piece 78, which forms the magnetic field generated by each excitation coil 76 to be directed across that air gap in which one of the duct modules 69 is disposed.

The use of plural excitation coils 78 in the PSP 18 is for redundancy and reduces the size of each coil 78 to permit them to be arranged compactly within a small space. Each coil 78 is separately powered by its own set of coil leads 104 to allow complete control and monitoring of each excitation coil 76. The overall shape of the magnetic field produced by the plurality of excitation coils 76a to 76h and the corresponding plurality of pole pieces 78a to 78h is toroidal. However, each of the pole pieces 78 has a pair of pole faces 93a and 93b disposed at its opposite ends. The pole faces 93a and 93b of a single pole piece 78 are disposed parallel to their respective duct modules 69 so that the magnetic field across the intermediate ducts 70 and the primary ducts 72, is uniform. Separate coil leads 104 are introduced into the PSP/IHX assembly 15 via the downcomer annulus 86 to each of the excitation coils 76. Each coil 76, as shown in FIG. 4, has a plurality of hollow turns 98 connected electrically in series with each other.

To maximize the magnetomotive force produced for a given volume of the excitation coils 76, the turns 98 thereof are hollow and are cooled by circulating a small amount of the intermediate sodium therethrough, as illustrated in FIG. 4. A small portion of the intermediate liquid metal forced into the lower, interior plenum 68b is directed up through one of a plurality of inlet conduits 94 in communication with the plenum 68b. The plurality of inlet conduits 94 direct the cooling intermediate liquid metal into an inlet manifold 92 of circular configuration. As shown in FIGS. 4 and 5A, a plurality of inlet feeders 100 transmits the cooling, intermediate liquid metal into the turn 98. The cooling, intermediate liquid metal is discharged from the turns 98 through a plurality of outlet feeders 102 into an outlet manifold 90, also of circular configuration. In turn, the intermediate liquid metal is discharged from the outlet manifold 90 upwardly through a plurality of outlet conduits 96 into the flow coupler upper plenum 66. In an illustrative embodiment of this invention, the pressure drop across the turns 98 of the excitation coil 76 is designed to be the same as the pressure drop across the primary ducts 72a and 72b. Each excitation coil 76 is illustratively wound with 140 turns 98 of copper conductor of approximately one by one inch square. The turns 98 are hydraulically connected in seven parallel sets of 20 turns 98 each. The complete coil 76 may be wound electrically in a helical fashion with each set of 20 turns 98 winding from the outside of one layer thereof to the inside and there changing to the next layer to return from the inside to the outside of the excitation coil 76. Hence, each of the inlet and outlet feeders 100 and 102 may be connected to the outside of the coil 76.

The PSP 18 includes in the illustrative embodiment shown in FIG. 6A, 16 primary ducts 72 and 16 intermediate ducts 70. An adjacent pair of one primary duct 72 and one intermediate duct 70 form a flow coupler. In this illustrative embodiment, there are 16 such flow couplers. A pair of such flow couplers comprised of four ducts 70 and 72 form one of the duct modules 69. Each flow coupler module 69 acts in parallel with each other to transfer at high efficiency the internal energy in the form of a relatively high hydraulic head or pressure of the intermediate sodium as established by the mechanical pump 22 to the primary liquid metal by action of the coupled electric currents and magnetic field. Such coupling is based on the Lorentz relation where the force (vector) on a charge $q_o$ moving through a magnetic field B with velocity V is expressed by the relation:

$$F = q_o V \times B.$$

As this is a vector relationship, the force F is maximized when velocity V is perpendicular to the magnetic field B. The excitation coils 76 create a toroidally-shaped magnetic field as indicated by the arrows 75, which passes through each of the flow couplers of each duct module 69. As the magnetic field as indicated by the arrows 75 passes through each of the primary ducts 70, the interaction of the intermediate liquid metal pumped upwardly along a line perpendicular to the face of FIGS. 6A and 6B and the magnetic field 75 directed at right angles to that line, ultimately causes a current flow directed radially inward toward the center of the PSP 18, as indicated by the dotted line 73a.

As illustrated in FIGS. 6A and 6B, each duct module 69 is formed within a laminate structure 80. The laminate structure 80 is comprised of a plurality of interleaved, rectangularly shaped plates 114 and 130, as respectively shown in FIGS. 6A and 6B. The composite plates 114 includes a pair of side elements 116a and 116b disposed along the sides of the duct module 69 and made of a magnetic material to facilitate in conjunction with the pole pieces 78, the flow of the magnetic field 75 through the air gaps formed by the duct modules 69. The composite plate 114 further includes top and bottom elements 118a and 118b made of an electrically conductive material of increased strength such as a non-magnetic steel, to resist internal pressures within the ducts 70 and 72, without "short-circuiting" the magnetic field about the duct modules 69. The return conductors 130 may in one illustrative embodiment of this invention be an integrally formed, rectangularly shaped member, having side portions 130a and 130b disposed along the long sides of the duct modules 69, a top portion 130c disposed at the top of the duct module 69, a bottom element 130d disposed at the other end of the duct module 69.

As shown in FIG. 6A, a pair of effective return paths 73b is formed within the side elements 116a and 116b about the ducts 70 and 72 before being reintroduced into the primary duct 72a. The current flow within each duct module 69 and its laminate structure 80 is electrically isolated from each other. The interaction between the current flow directed radially inward along the path 73a through the pump ducts 72a and 72b, and the magnetic field 75 directed perpendicular to such current flow 73a, imposes a force on the primary liquid metal within the primary ducts 72a and 72b pumping the primary liquid metal downwardly along a line perpendicular into the page of FIGS. 6A and 6B.

The intermediate ducts 70 are alternated with the primary ducts 72 to avoid circulating end currents therein. Each of the ducts 70 or 72 is sized individually to be of optimal proportion for the liquid metal directed therethrough. The toroidal magnetic field geometry makes optimal use of the space within the PSP outer shell 49, making it possible to keep the outer diameter of the PSP outer shell 49 of approximately the same size as that of the IHX outer shell 48. Further, the toroidal configuration of the magnetic field minimizes the amount of iron within the plurality of the pole pieces 78a to 78h.

Figure 5B:
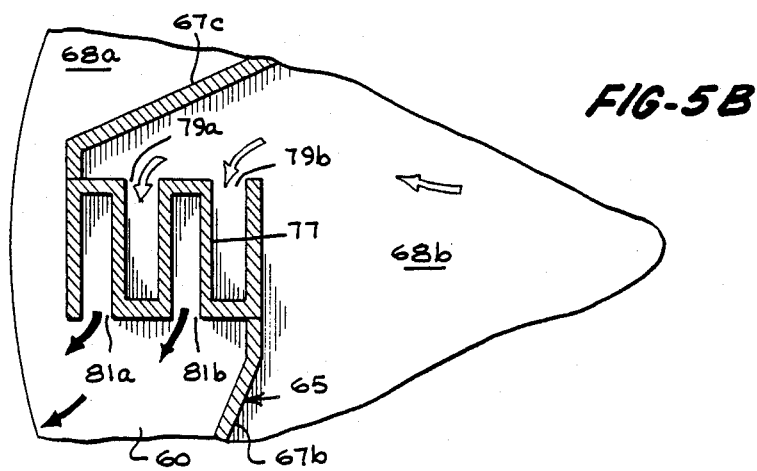

Referring now to FIGS. 4, 5A and 5B, the details of the upper and lower plenums 66 and 68 will be described. FIG. 5A shows the upper plenum 66 with the support plate 56 partially broken away to show the structure and configuration of the baffle 87. Generally, the baffle 87 is disposed between the annular support plate 56a and the outer, lower support plate 58, as shown in FIG. 4. As best seen in FIG. 5A, the baffle 87 is comprised of a plurality of partition sections 83a to 83h. Each partition section 83 extends from the outer periphery of the pump duct 72a of one duct module 69 to the inner periphery of the generator duct 70b of the next duct module 69. The partition sections 83a to 83h form together the baffle 87 and divide the space between the support plates 58 and 56 into an upper, exterior plenum 66a and an upper, interior plenum 66b. A flows separator 85 is of a serpentine configuration, as shown in FIG. 5A, and is disposed between one partition section 83 and the next partition section 83. The flows separator 85 follows the configuration of the pump ducts 72 and the generator ducts 70 to separate the primary and intermediate flows of liquid metals from each other. In particular, the separator 85 forms inlets 89a and 89b to permit the flow of the primary liquid metal from the pool through the upper, exterior plenum 66a and into the pump ducts 72a and 72b, flowing downwardly along a line perpendicular to the face of FIG. 5A. Further, the flows separator 85 defines outlets 91a and 91b permitting the flow of the intermediate liquid metal upward along a line perpendicular to the face of FIG. 5A, through the outlets 91a and 91b and the upper, interior plenum 66b, before exiting upwardly through a passageway formed between the cylindrically shaped collar 56b and the outer downcomer pipe 44 and into the cylindrically shaped cavity of the IHX 16. This structure, reduces the need for further, relatively heavy support plates, while providing two distinct plenum chambers for the passage respectively of the intermediate and primary liquid metals.

Referring now to FIGS. 5B and 4, the structure of the lower, interior and exterior plenums 68b and 68a will be described. The lower, exterior and interior plenum 68a and 68b are formed between the outer, lower support plate 60 and the annularly shaped, inner lower support plate 62, as best shown in FIG. 4. As best shown in FIG. 5B, the baffle 65 is disposed circularly about the space defined by the support plates 62 and 60, to divide that space into the lower, exterior and interior plenums 68a and 68b. The baffle 65 is comprised of a plurality of partitions 67. Each partition 67 extends from the outer peripheral edge of the pump duct 72a of one duct module 69 to the inner peripheral edge of the generator duct 70b of the next duct module 69. A flows separator 77 is disposed between the leading end of one partition section 67b and the trailing end of the next partition section 67c. The flows separator 77 is of a serpentine configuration forming inlets 79a and 79b to permit the flow of the intermediate liquid metal through the lower, interior plenum 68b, and into and upwardly through the generator ducts 70a and 70b. Further, the flows separator 77 forms outlets 81a and 81b to direct the flow of the primary liquid metal from the pump ducts 72a and 72b through the lower, exterior plenum 68b to be discharged from the PSP/IHX assembly 15 at relatively high pressure into a complementary plenum (not shown) in the reactor, whereby the pressurized flow of the primary liquid metal may be returned to the reactor core 12.

Referring now to FIGS. 4, 5A and 5B, a brief summary of the hydraulic flows of the intermediate and primary liquid metals will be given. The arrows 84-1 to 84-8 indicate the flow of the intermediate liquid metal through the PSP/IHX assembly 15, starting with arrow 84-1 indicating where the flow of the intermediate liquid metal begins and arrow 84-8 indicating where the intermediate liquid metal exits from the assembly 15. The intermediate liquid metal is received from the inlet conduit 21 of the intermediate loop 20 and is directed downward through the inner downcomer pipe 44 and into the lower, interior plenum 68b, where the flow of the intermediate liquid metal is reversed, directing the intermediate liquid metal back upward through each set of the intermediate ducts 70a and 70b of each of the duct modules 69. The parallel flows of the intermediate liquid metal through the 8 sets of intermediate ducts 70, is introduced into the upper, interior plenum 66b, which collects and directs with a minimum loss of pressure the intermediate liquid metal upward through the annulus formed by the collar 56b and the downcomer pipe 45, and into the IHX 16. The intermediate liquid metal flows upwardly through the IHX 16 circulating about and through the spaces between the tubes 54, before being discharged through the intermediate outlet conduit 46, to be returned by the outlet conduit 23 to the intermediate loop 20.

In a similar fashion, the primary liquid metal is directed through the PSP/IHX assembly 15 along the path and in the sequence as indicated by the arrows 82-1 to 82-6. The heated primary liquid metal is returned from the reactor core 12 and is introduced into the tubes 54 of the IHX 16, giving up its thermal energy to the intermediate liquid metal flowing thereabout. The cooled primary liquid metal exits the tubes 54 flowing through the IHX lower plenum 64 and back into the reactor pool. The primary liquid metal from the reactor pool is introduced into the upper, exterior plenum 66a, being directed by the baffle 87 through the openings 89a and 89b and downward through each of a plurality of sets of the primary ducts 72a and 72b thus being pumped, before being discharged through outlets 81a and 81b and the lower, exterior plenum 68a into the complementary reactor plenum (not shown).

Figure 8A:
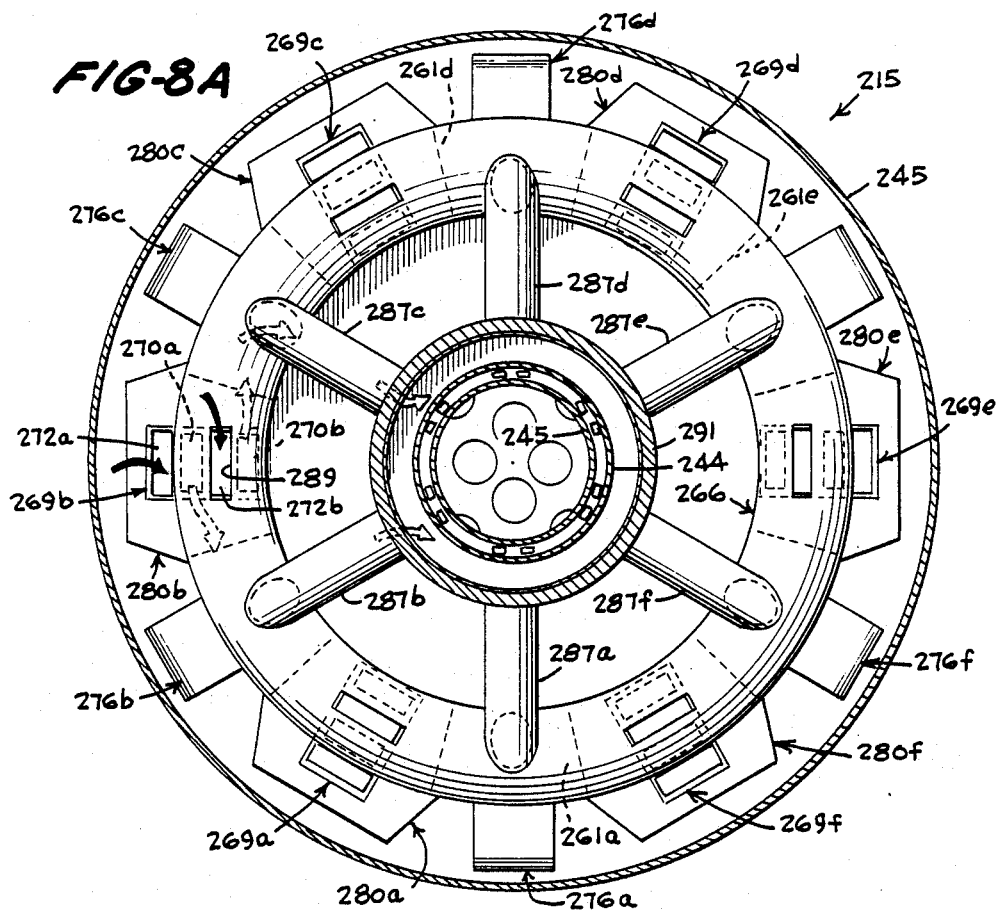
FIGS. 8A and 8B are respectively plan, sectioned views of the PSP/heat exchanger assembly as taken along lines 8A—8A and 8B—8B of FIG. 7.
Figure 8B:
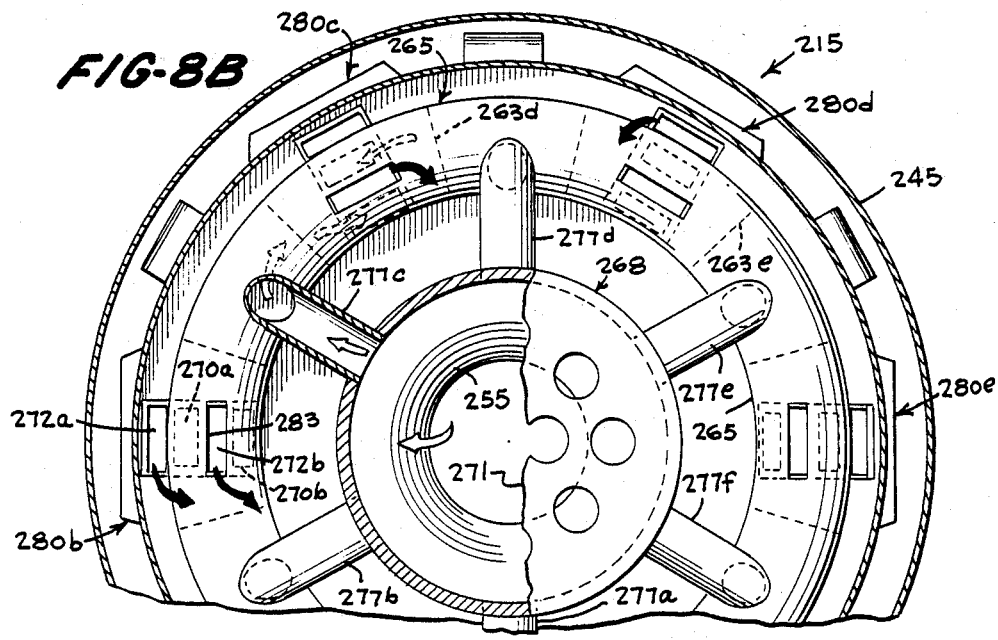

Referring now to FIGS. 7, 8A and 8B, the details of a second, further embodiment of this invention in the form of a PSP/IHX assembly 215 is shown. The elements of the PSP/IHX assembly 215, which are similar to those of the PSP/IHX assembly 15, are designated with similar numbers, but in the 200 series. The intermediate liquid metal is introduced into the PSP/IHX assembly 215 flowing down through the inner downcomer pipe 245 to be introduced into the lower, flow coupler plenum 268. The plenum 268 includes a spherically shaped dome 279 and a hydrostatically balanced momentum plate 271, having a number of openings therein, as shown particularly in FIG. 8B, for containing the downward force and pressure of the intermediate liquid metal and for diverting it via a plurality of radially directed pipes 287a to 287e, as shown best in FIG. 8A. The dome 279 contains the pressure of the intermediate liquid metal which before passing through the flow coupler 218·is high relative to the pressure of the primary liquid metal. In particular, the dome 279 distributes the pressure of the intermediate liquid metal over its spherical surface as a "membrane stress". The pressure of the primary liquid metal in plenum 281 is lower than the pressure of the intermediate flow of the liquid metal flowing in the plenum 268. The plate 271 redirects the momentum of the flow of the intermediate liquid metal from a downward to a radial direction. Using two separate structures allows each to be a relatively thin memer, thus reducing weight.

The intermediate liquid metal flows through the pipes 284 to a plenum 265 shaped like one-half of a torus, as sectioned in the plane of the torus. As shown in FIG. 7, the minor diameter of the toroidal plenum 265 is sufficient to cover the generator ducts 270a and 270b, as well as the pump duct 272b. As suggested by the arrow 284-4, the intermediate liquid metal flows from the toroidal plenum 265 upward through the generator ducts 270a and 270b. As the toroidal plenum 265 also covers the pump duct 272b, it is necessary to provide a flow through conduit 283 extending through the toroidal plenum 265 to discharge the primary liquid metal from the pump duct 272b. In the region between the duct modules 269, where the pipes 277 direct the intermediate liquid metal radially into the toroidal plenum 265, the toroidal plenum 265 is closed by a plurality of relatively thick, pressure plates 263, as shown in FIGS. 7 and 8B. The pressure plates 263 strengthen the plenum chamber 265 to withstand the pressure difference between the liquid metals on either side of the chamber 265.

The intermediate liquid metal exiting the generator ducts 270a and 270b pass into an upper flow coupler plenum 266 similar to the lower flow coupler plenum 268, described above. The upper flow coupler plenum 266 comprises a toroidal plenum 285 having a minor diameter selected such that the plenum 285 covers the generator ducts 270a and 270b to receive the intermediate liquid metal discharged therefrom, as well as the pump duct 272b. As illustrated in FIGS. 7 and 8A, a plurality of pressure plates 261a to 261f is disposed between the duct modules 269 to strengthen the plenum 285. To permit the primary liquid metal to be discharged from the pump duct 272b, a flow-through conduit 289 extends through the toroidal plenum 285. As shown in FIGS. 7 and 8A, the intermediate liquid metal introduced into the toroidal plenum 285 flows inwardly through a plurality of radial pipes 287a to 287e,·to an intermediate conduit 291 disposed concentrically about the outer downcomer pipe 244, forming an annular passageway to permit the upward flow as indicated by the arrows 284-7 of the intermediate liquid metal.

The flow of the intermediate liquid metal is indicated by the arrows 284, starting initially with the arrow 284-1 indicating the flow of the liquid metal down the inner downcomer pipe 245 and into the lower flow coupler plenum 268, which disperses the intermediate liquid metal as indicated by the arrows 284-3 and 284-4 through the radial pipes 284 and into the toroidal plenum 265. Next, the intermediate liquid metal is directed in parallel through each set of the duct conduits 270a and 270b upward through the flow couplers, being collected in the toroidal plenum 285. The inner end of each pipe 287 is bent upward to provide a smooth connecting portion 275, which is coupled to the annular passage between the conduit 291 and the outer downcomer pipe 244. The intermediate liquid metal is directed in parallel through the plurality of pipes 287, before being diverted upward through the conduit 291 and, thereafter, being directed to the IHX 216.

Primary liquid metal from the pool enters the PSP/IHX assembly 215 at the top passing down through the tubes 254 of the IHX 216 to be discharged into the IHX plenum 264. The discharged primary liquid metal is diverted by a hydrostatically balanced momentum plate formed by an upper annular plate 249a of the PSP outer shell 249. The upper annular plate 249a has a plurality small holes 253 therethrough allowing the pressure on either side of the plate 249a to be equal. Thus, the plate 249a only changes momentum and never has to support large pressure difference. Thus, the plate 249a can be constructed as a relatively thin member.

The primary liquid metal enters the flow coupler 218 directly from the pool through an annularly shaped opening 249b formed within the PSP outer shell 249, flowing upwardly into an upper primary plenum 293. The primary liquid metal is introduced in parallel into a plurality of the sets of pump ducts 272a and 272b, flowing downwardly and being pumped by the flow coupler action, before being discharged as a highly pressurized fluid into a lower primary plenum 281 shaped as a semisphere. The pressurized primary metal discharged into the lower primary plenum 281 is directed by a conduit coupled to the bottom of the lower primary plenum 281 to the nuclear core 12. The embodiment shown in FIGS. 7, 8a and 8b rearranges the flow coupler plenums, permitting the use of relatively thin wall pressure vessels instead of heavy thick pressure plates. This change of materials provides a weight reduction of up to one third of the overall weight. Further, this embodiment does not employ a PSP outer shell, so that the flow coupler 218 now communicates more freely with the reactor pool.

The structure and operation of a third embodiment of this invention in the form of a PSP/IHX assembly 315 are described with respect to FIGS. 9A, 9B and 9C, where elements similar to of those of the PSP/IHX assembly 15 are identified with like numerals, but in the 300 series. Referring first to FIG. 9A, the intermediate liquid metal is initially directed downward from the pool through an intermediate fluid inlet conduit formed by the inner downcomer pipe 345, striking a flat plate 379, whereby the primary liquid metal is diverted through a plurality of interconnecting conduits 381 crossing a return flow of the intermediate liquid metal, to introduce the intermediate liquid metal into an upper intermediate plenum 367 formed between the upper support plate 356 and an intermediate support plate 357 disposed therebelow. From the upper intermediate plenum 367, the intermediate liquid metal flows in parallel through a plurality of sets of the pump ducts 370a and 370b downward. The intermediate liquid metal is discharged from the bottom, outlet ends of the duct conduits 370 being collected in a lower plenum 368, before being directed upwardly through an intermediate, upflow conduit 371 to be returned to the IHX 316.

The primary liquid metal is introduced at the top of the IHX 316, being directed downwardly through the tubes 354. The primary liquid metal is discharged into the IHX lower plenum 364 and therefrom into the reactor pool. The primary liquid metal is introduced into the flow coupler 318 at the bottom thereof and, in particular, through openings within the lower support plate 360, which are in turn connected to corresponding pump ducts 372a and 372b. The primary liquid metal flows upwardly through each set of the pump ducts 372a and 372b to be collected by the upper flow coupler plenum 366, which is shown more fully in FIG. 9C. The primary liquid metal exits from each set of the pump ducts 370a and 370b flowing inwardly as indicated by the arrows, through the upper flow coupler plenum 366 and a first plurality of flow-through conduits 383 crossing the intermediate up-flow conduit 371, discharging the primary liquid metal into an intermediate fluid outlet conduit 377, which directs the primary liquid metal downward to be returned to the reactor core 12. The third embodiment of the PSP/IHX assembly 315, as particular shown in FIG. 9A, permits the primary liquid metal to be introduced and discharged from the flow coupler 318 at the same level, i.e. at the bottom thereof, as disposed well down in the reactor pool.

Since numerous modifications may be made in the above-described apparatus without departing from the spirit and scope of the invention, it is intended that the foregoing description be interpreted as illustrative, and not in a limiting sense.

What is claimed is:

1. A heat exchanger and pump assembly for transferring thermal energy from a heated, first electrically conductive fluid to a pumped, second electrically conductive fluid and for transferring internal energy from said pumped, second electrically conductive fluid to said first electrically conductive fluid, said assembly adapted to be disposed within a pool of said first electrically conductive fluid and comprising:

(a) a heat exchanger comprising means for defining a first annularly shaped cavity for receiving a flow of said second electrically conductive fluid and a plurality of tubes disposed within said cavity, whereby said second electrically conductive fluid in said cavity is heated, each of said tubes having an input and an output end, said input ends being disposed at the top of said heat exchanger for receiving from said pool a flow of said first electrically conductive fluid therein, said output ends being disposed at the bottom of and free of said cavity defining means for discharging said first electrically conductive fluid directly into said pool;

(b) a pump disposed beneath said heat exchanger and comprised of a plurality of flow couplers disposed in a circular array, each flow coupler comprised of a pump duct for receiving said first electrically conductive fluid and a generator duct for receiving said second electrically conductive fluid;

(c) a conduit disposed centrally of said annularly shaped cavity and within said circular array of said flow couplers for receiving said second electrically conductive fluid;

(d) a first plenum chamber disposed beneath said pump in communication with said centrally disposed conduit for receiving said second electrically conductive fluid and in communication with each of said generator ducts of said flow couplers for directing said pumped, second electrically conductive fluid upwardly through said generator ducts; and (e) means for defining a second cavity disposed above and adjacent said pump and comprising a baffle for dividing said second cavity into a second plenum chamber and a third plenum chamber, said second plenum chamber being disposed in open communication with said pool and in communication with said pump ducts for directly receiving said first electrically conductive fluid from said pool and for directing said first electrically conductive fluid in parallel through said pump ducts, said third plenum chamber being disposed in communication with said generator ducts for receiving in parallel and collecting said second electrically conductive fluid therefrom.

2. The heat exchanger and pump as claimed in claim 1, wherein said second cavity comprises first and second annular plates, said baffle disposed therebetween.

3. The heat exchanger and pump as claimed in claim 2, wherein there is including an annular collar disposed about said conduit for forming a passageway between said third plenum chamber and said first cavity for the flow of said second electrically conductive fluid to said first cavity and a space in communication with said output ends of said tubes and open to said pool for discharging said first electrically conductive fluid directly into said pool.

4. The heat exchanger and pump as claimed in claim 2, wherein said second annular plate comprises a plurality of sets of first and second openings, said first and second openings being coupled respectively to said pump and generator ducts, said baffle including separator means disposed between said first and second openings of each of said plurality of sets for defining an inlet for the flow of said first electrically conducted fluid through said first opening into its corresponding pump duct and an outlet for discharging said second electrically conductive fluid from its generator duct and through its second opening into said third plenum chamber.

5. The heat exchanger and pump assembly as claimed in claim 1, wherein there is included third and fourth plates disposed beneath said pump for defining a third cavity therebetween, and a second baffle disposed between said third and fourth plates for defining said first plenum chamber and a fourth plenum chamber.

6. The heat exchanger and pump as claimed in claim 5, wherein said fourth plenum chamber is disposed in communication with said pump ducts for receiving said first electrically conductive fluid therefrom and open to said pool for discharging said first electrically conductive fluid thereto.

7. The heat exchanger and pump assembly as claimed in claim 6, wherein said third support plate includes a plurality of sets of third and fourth openings therethrough in communication respectively with said pump and generator ducts, said second baffle comprising separator means disposed between said third and fourth openings of each of said sets for defining an inlet for the flow of said second electrically conductive material from said first plenum chamber through its fourth opening and into its generator duct, and an outlet for discharging said first electrically conductive material from its pump duct through its third opening and said fourth plenum chamber into said pool.

* * * * *